May 31, 1960 D. H. MEYER ET AL 2,938,837
PROCESS FOR THE PURIFICATION OF AN AROMATIC
DICARBOXYLIC ACID LOWER ALKYL ESTER
Filed July 11, 1957
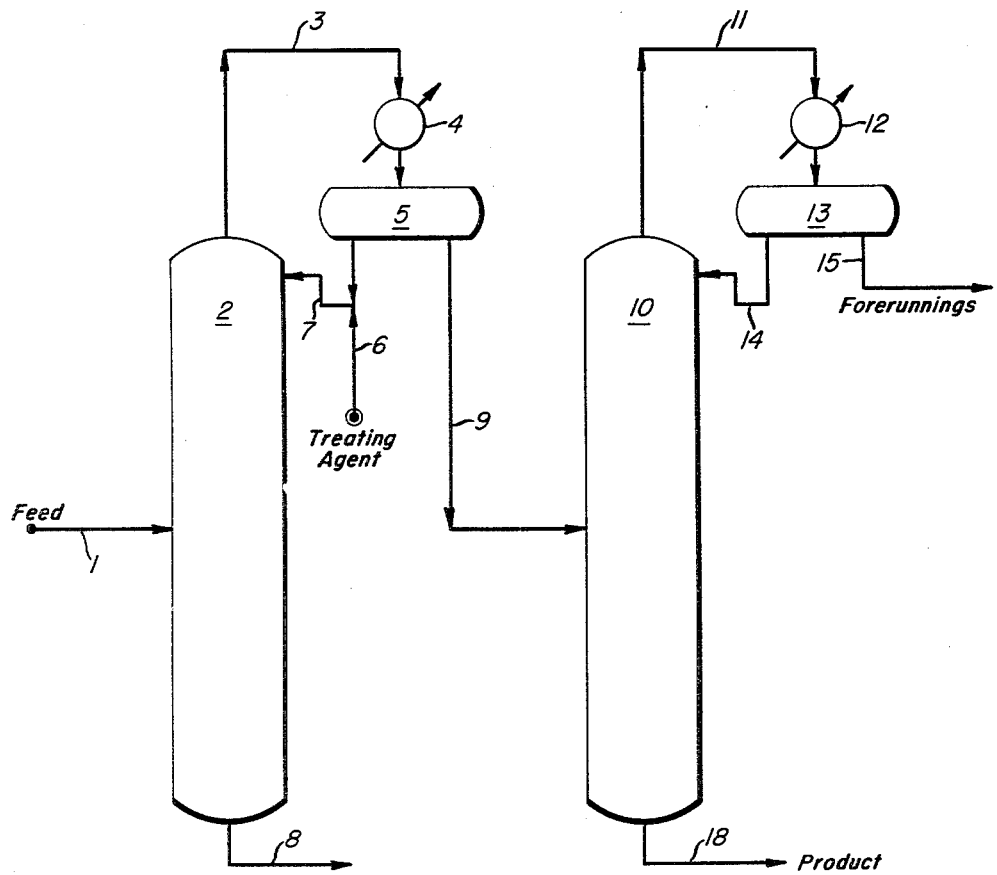
INVENTORS:
Delbert H. Meyer
BY  Donald E. Burney
ATTORNEY United States Patent Office 2,938,837
Patented May 31, 1960

2,938,837
PROCESS FOR THE PURIFICATION OF AN AROMATIC DICARBOXYLIC ACID LOWER ALKYL ESTER

Delbert H. Meyer, Highland, and Donald E. Burney, Whiting, Ind., assignors to Standard Oil Company, Chicago, Ill., a corporation of Indiana
Filed July 11, 1957, Ser. No. 671,135
6 Claims. (Cl. 202—57)

This invention relates to esters of aromatic acids and more particularly relates to the purification of esters of aromatic dicarboxylic acids having acid numbers too high for use in the formation of polyesters.

Lower alkyl esters, i.e. those containing from 1 to 4 carbon atoms in each alkanol group, of aromatic dicarboxylic acids are commonly used for such purposes as synthetic lubricants and plasticizers for a variety of plastics and as intermediates in several chemical reactions. In one important reaction the lower esters of the aromatic dicarboxylic acids—orthophthalic, isophthalic (meta), and terephthalic (para) acids— are employed in a transesterification reaction wherein the alkanol group is exchanged with a dihydric alcohol and the resulting phthalic acid di-glycol (for example, bis-2-hydroxy-ethyl terephthalate) thereafter polymerized at very high vacuum to form linear polyesters which are synthetic resins, useful in the production of strong films and fibers. Transesterification is an extremely useful route to the production of linear polyesters, particualrly of isophthalic and terephthalic acids where the lower alkyl diesters provide considerably faster reaction rates, better process control, and improved ease of handling over esterifications using the acids themselves. But for purposes such as transesterification to make polyester resins, it is essential for process control and product quality (e.g. color, chemical resistance, and high molecular weight of the resins) that the aromatic diesters be available in substantially pure form and have acid numbers below about 0.1. It has heretofore been extremely difficult to obtain such esters in requisite purity as the esterification reaction is comparatively slow and is equilibrium limited, resulting in the retention of unesterified carboxylic acid groups in the form of a monoester or the unesterified aromatic acid.

In the past it has been the practice to distill impure diesters of aromatic dicarboxylic acids at atmospheric pressure or under vacuum to separate the volatile diesters from the less volatile monoesters and compartively non-volatile unesterified acids. One process of this type, involving four distillation towers, is shown in Hughes et al. U.S. Patent 2,646,393, a patent which illustrates the difficulty in obtaining pure esters, as the data report recovery of only 85.3% of dimethyl terephthalate having an acid number of 0.6.

Distillation alone has not proved entirely satisfactory as a method of producing low acid number aromatic acid esters, particularly since distillation at low pressures, for example between 10 and 760 millimeters mercury absolute, involves high vapor velocities and correspondingly poor fractional separation efficiencies unless very large distillation towers are employed. It is therefore the primary object of our invention to provide a convenient method for purifying lower alkyl esters of aromatic dicarboxylic acid so as to obtain a product having a low acid number which is suitable for use in processes requiring an exceptionally high purity aromatic acid diester.

According to the method of our invention, lower alkyl esters (those containing from 1 to about 4 carbon atoms in each alkanol group) of aromatic dicarboxylic acids are melted and intimately contacted with an alkali metal carbonate treating agent, and the reaction mixture distilled to separate a purified ester having a markedly lower acid number than the feed. The alkali metal carbonate treating agents suitable for use in our invention are the alkali metal carbonates and bicarbonates and the various hydrated carbonates and bicarbonates. While both the carbonates and bicarbonates have been found suitable, particularly high yields of purified low acid number aromatic esters are obtained with the bicarbonates, and of these sodium bicarbonate has been found to be very convenient and effective in use. Other alkali metal carbonates and bicarbonates also suitable are those of lithium, potassium, rubidium, and cesium. It appears that the function of the treating agent is to lower the volatility of the monoester and the aromatic acid and permit efficient distillation of a pure diester from the reaction mixture. In comparison with yields on simple distillation in the absence of a treating agent, our process gives a yield at least five percent higher of a lower acid number product.

As the initial step in our process, the molten aromatic acid esters are contacted with the alkali metal carbonate treating agent. The agent may be disposed in particulate form in a fixed or moving bed or, more effectively, in a system where the alkali metal carbonates are finely divided and are suspended as a slurry in the molten esters. Where the acid number of the feed ester is relatively high, e.g. above about 2–5, or where it is desired to provide long contacting times, it is advantageous to provide a separate contacting vessel in which the ester may be exposed to a large excess of treating agent for a long period of time, and filtering off excess treating agent prior to distillation. However, where the acid number of the feed ester initially is low or where acid number requirements of the product are not so critical it is sufficient to contact the ester with the treating agent in the distillation column or evaporator used for distilling off the purified ester. In the latter event the treating agents are preferably employed in finely divided form and added to the still or evaporator either with the feed, with the reflux, or charged into the still pot; superior purification is achieved when the treating agent is admixed with the reflux to the still provided the still has weir-free fractionation plates or perforated pans adapted to avoid plugging by the solid treating agent. Where conventional vacuum distillation equipment is to be converted to our process, the treating agent may be charged to the reboiler or calandria, and it is preferable to convert the tower to a batch distillation unit whereby the feed may enjoy a longer residence time in the reboiler.

The minimum quantity of treating agent necessary to react with unesterified carboxylic acid groups in the feed may readily be computed from the acid number of the feed. For example, assume a raw di-n-butyl orthophthalate having an acid number of 5.0 is to be treated with sodium carbonate (MW 106). From the definition of "acid number" which is the number of milligrams of potassium hydroxide (MW 56) required to neutralize one gram of the ester, the weight of sodium carbonate (two equivalents of alkali metal per molecule) needed to react with one pound of the ester is:

$$1 \times \frac{5}{1000} \times \frac{1}{56} \times \frac{106}{2} = .00473 \text{ lbs.}$$

To assure substantially complete neutralization in a short period of time it is desirable to employ an excess of the treating agent, e.g. from 10 to 200% or more over the stoichiometric amount. Even larger quantities may be used with a corresponding reduction in the necessary contact time. The surplus may be withdrawn from the bottom of the distillation tower along with the reaction product and may either be discarded or recovered, depending on its cost and the value of the reaction products.

The contact time between the ester and treating agent depends on the acid number of the feed and the desired acid number of the product. It has been found that times of from ½ to 60 minutes, advantageously from about 5 to 15 minutes, are effective for about 98% acid number reduction where the treating agent is finely divided; longer times of up to three hours are required for particulate forms of alkali metal carbonate agents. The contacting temperatures may be any temperature at which the ester is a liquid, and in this connection reference is made to Table I which gives the atmospheric melting and boiling points of the aromatic dicarboxylic acids and some of their lower esters, although it will be understood that this purification process is applicable to esters of secondary and tertiary alcohols as well as the normal alkanols shown.

TABLE I

Physical properties of phthalic acids and esters

|  | O-Phthalic Acid | | Isophthalic Acid | | Terephthalic Acid | |
| --- | --- | --- | --- | --- | --- | --- |
|  | M.P., °C. | B.P., °C. | M.P., °C. | B.P., °C. | M.P., °C. | B.P., °C. |
| Acid | d 206 | d 191 | 330 | s | 425 | s 300 |
| Anhydride | 131 | 294 |  |  |  |  |
| Ester: |  |  |  |  |  |  |
| Monomethyl | 85 |  | 193 |  | 230 | s |
| Dimethyl | 5.5 | 282 | 68 | 124 | 141 | 288 |
| Monoethyl | 2 |  | 115 |  |  |  |
| Diethyl |  | 296 | 11 | 302 | 44 | 141 |
| Di-n-Propyl |  |  |  |  | 25 | 165 |
| Di-n-Butyl |  | 340 |  | 192 | 17 | 185 | d—decomposes to phthalic anhydride.
s—sublimes.

For conducting the distillative separation of the purified ester from the raw ester and treating agent reaction mixture it is advantageous to employ some fractionation and reflux although a product of somewhat lower purity may be obtained by simple evaporation. Either batch or continuous distillation may be used. Distillation towers having an effectiveness of from 2 to 10 theoretical plates and employing a reflux ratio between about .05 to .5 volumes of reflux per volume of distillate have been found effective. The distillation is conducted at low pressures so as to avoid decomposition of the esters and is advantageously conducted under vacuum, e.g. between about 5 and 760 millimeters mercury absolute, preferably between 10 and 100 and typically 30 millimeters, and at a reboiler temperature sufficient to vaporize the completely esterified acids but not the partially esterified acids or the acids themselves.

Better understanding of this invention will be obtained upon reference to the drawing which is a diagrammatic representation of the preferred system for the purification of dimethyl terephthalate.

As an illustrative example of our invention, impure dimethyl terephthalate is introduced via line 1 to continuous fractional distillation column 2, having a reflux system comprising overhead line 3, reflux condenser 4 and overhead receiver 5. Sodium bicarbonate treating agent is introduced in the form of a slurry in a minor amount of dimethyl terephthalate via line 6 into the reflux return line 7. In distillation tower 2, an overhead stream comprising treated dimethyl terephthalate together with forerunnings is taken overhead, while a bottoms comprising reaction mixture is withdrawn via line 8.

Excess reflux from receiver 5 is conducted through line 9 to a second fractional distillation column 10. In column 10, the main product is taken through line 18 as a bottoms, while a forerunning is distilled overhead through vapor line 11, reflux condenser 12, overhead receiver 13, and reflux line 14.

Exemplary of the esters which may be treated according to this invention are the orthophthalic, isophthalic, and terephthalic acids esterified with the following alkanols: dimethyl, diethyl, di-n-propyl, di-i-propyl, di-n-butyl, di-i-butyl, di-t-butyl, methyl ethyl, methyl i-butyl, ethyl i-propyl, and i-propyl n-butyl. It will be noted that the alkanol may be primary, secondary, or tertiary, and that a mixture of esters of one or more acids with one or more alkanols may be similarly treated, provided the fully esterified aromatic esters have boiling points lower than the reaction product of the treating agent and the partially esterified acids.

To further illustrate the process of our invention, the following example is presented.

*Example*

A mixture of dimethyl isophthalate and dimethyl terephthalate having an acid number of 2.0 was treated according to the process of this invention. Acid number 2.0 corresponds to about .64 weight percent of the monomethyl ester, and requires for neutralization 3.0 milligrams of sodium bicarbonate per gram of mixed ester. 100 parts by weight of the mixed isophthalate-terephthalate ester was melted and treated with 1 part (234% excess) of sodium bicarbonate for about 10 minutes in an open corrosion-resistant vessel. The mixture was agitated intermittently. The liquid reaction mixture was then transferred to the reboiler of a 10 plate batch distillation column and distilled under 30 millimeters mercury absolute pressure and a reboiler temperature of about 165–180° C., with a small amount of reflux. 91.6 parts of the ester was distilled overhead, corresponding to a weight recovery of 91.6% of the ester. Distillation was discontinued when stream samples of the distillate reached an acid number of 0.07; the product had an average acid number of about 0.04.

We claim:

1. A process for the preparation of an aromatic dicarboxylic acid lower alkyl ester having an acid number below about 0.1, which process comprises intimately contacting an impure molten diester containing a small amount of the monoester with a solid alkali metal carbonate treating agent, and distilling from the ester and treating agent reaction mixture, at a temperature sufficiently low so as to avoid decomposition of the esters, a purified ester product having an acid number below about 0.1 while retaining the monoester in the distillation residue.

2. Process of claim 1 in which the treating agent is an alkali metal bicarbonate.

3. Process of claim 2 in which the alkali metal bicarbonate is sodium bicarbonate.

4. Process of claim 1 in which the diester is a diester of terephthalic acid.

5. Process of claim 4 in which the diester of terephthalic acid is dimethyl terephthalate.

6. A process for the preparation of dimethyl terephthalate having an acid number below about 0.1, which process comprises intimately contacting impure molten dimethyl terephthalate with a solid alkali metal carbonate treating agent at a temperature sufficiently low so as to avoid decomposition of the esters, and distilling from the mixture of impure dimethyl terephthalate and treating agent a heartcut comprising purified dimethyl terephthalate product having an acid number below about 0.1 while retaining the monoester in the distillation residue.

References Cited in the file of this patent

UNITED STATES PATENTS

| 1,554,032 | Reid | Sept. 15, 1925 |
| 2,508,911 | Garner et al. | May 23, 1950 |
| 2,760,972 | Joy | Aug. 28, 1956 |
| 2,805,246 | Bourgvignon et al. | Sept. 3, 1957 |

FOREIGN PATENTS

| 510,894 | Canada | Mar. 15, 1955 |

UNITED STATES PATENT OFFICE
CERTIFICATE OF CORRECTION

May 31, 1960

Patent No. 2,938,837

Delbert H. Meyer et al.

It is hereby certified that error appears in the printed specification of the above numbered patent requiring correction and that the said Letters Patent should read as corrected below.

Column 4, lines 59 and 60, strike out "at a temperature sufficiently low so as to avoid decomposition of the esters"; line 62, after "agent" insert -- at a temperature sufficiently low so as to avoid decomposition of the esters, --.

Signed and sealed this 1st day of November 1960.

(SEAL)
Attest:

KARL H. AXLINE
Attesting Officer

ROBERT C. WATSON
Commissioner of Patents